US008959231B2

(12) United States Patent
Mayer et al.

(10) Patent No.: US 8,959,231 B2
(45) Date of Patent: Feb. 17, 2015

(54) REPRESENTATION OF BOOLEAN EXPRESSIONS FOR SPECIFYING FILTERS USING XML

(75) Inventors: Georg Mayer, Helsinki (FI); Richard Obermaier, München (DE); Heiko Straulino, Planegg-Martinsried (DE)

(73) Assignee: Siemens Aktiengesellschaft, Munich (DE)

( * ) Notice: Subject to any disclaimer, the term of this patent is extended or adjusted under 35 U.S.C. 154(b) by 1123 days.

(21) Appl. No.: 10/510,762

(22) PCT Filed: Apr. 12, 2002

(86) PCT No.: PCT/DE02/01382
§ 371 (c)(1),
(2), (4) Date: Jul. 27, 2005

(87) PCT Pub. No.: WO03/088611
PCT Pub. Date: Oct. 23, 2003

(65) Prior Publication Data
US 2006/0155852 A1 Jul. 13, 2006

(51) Int. Cl.
G06F 15/16 (2006.01)
G06F 15/173 (2006.01)
(Continued)

(52) U.S. Cl.
CPC .......... *G06F 17/30867* (2013.01); *H04L 67/16* (2013.01); *H04L 67/20* (2013.01);
(Continued)

(58) Field of Classification Search
USPC ......... 709/206, 207, 204, 205, 225, 227, 228; 715/513
See application file for complete search history.

(56) References Cited

U.S. PATENT DOCUMENTS 5,050,075 A * 9/1991 Herman et al. ........................ 1/1
5,513,126 A * 4/1996 Harkins et al. ................ 709/228
(Continued)

FOREIGN PATENT DOCUMENTS

CA 2317072 A1 * 10/1999 ................ G06F 9/44
CA 2317072 A1 * 4/2001
(Continued)

OTHER PUBLICATIONS

Bessler et al., A Service Platform for Internet-Telecom Services using SIP, IFIP COnference Proceedings vol. 178, p. 59-72, 2000.*
(Continued)

*Primary Examiner* — Edward Kim
(74) *Attorney, Agent, or Firm* — King & Spalding L.L.P.

(57) ABSTRACT

A simplified evaluation of messages that control connection setup is made possible by a method for filtering (4) incoming messages (3) at a connection controlling element (5) of a telecommunications network (13, 14, 5) on the basis of predetermined filtering conditions (8). According to this method, the filtering (4) ensues by comparing (4) text elements (20 to 29) in a received (6) message (3) with text elements (20 to 29) in a document (8), which can be accessed (7) by the connection controlling element (5) and which contains the filtering conditions in the form of text elements (20 to 29), and by verifying (4) whether, inside the document (8), logical links (30 to 32) of filtering conditions (20 to 29) apply to the message (3), said logical links being specified in an internet page description method (XML).

20 Claims, 5 Drawing Sheets (51) Int. Cl.
*G06F 17/30* (2006.01)
*H04L 29/08* (2006.01)
*H04L 29/06* (2006.01)

(52) U.S. Cl.
CPC ............ *H04L 67/306* (2013.01); *H04L 67/04* (2013.01); *H04L 67/02* (2013.01); *H04L 67/327* (2013.01); *H04L 69/22* (2013.01); *H04L 65/1016* (2013.01)
USPC .......... 709/227; 709/204; 709/205; 709/206; 709/207; 709/225; 709/228

(56) References Cited

U.S. PATENT DOCUMENTS

| | | | |
|---|---|---|---|
| 5,717,913 A * | 2/1998 | Driscoll | 1/1 |
| 5,826,076 A * | 10/1998 | Bradley et al. | 1/1 |
| 5,835,727 A * | 11/1998 | Wong et al. | 709/238 |
| 5,884,033 A * | 3/1999 | Duvall et al. | 709/206 |
| 5,996,011 A * | 11/1999 | Humes | 709/225 |
| 6,023,723 A * | 2/2000 | McCormick et al. | 709/206 |
| 6,134,591 A * | 10/2000 | Nickles | 709/229 |
| 6,321,267 B1 * | 11/2001 | Donaldson | 709/229 |
| 6,366,926 B1 * | 4/2002 | Pohlmann et al. | 1/1 |
| 6,564,251 B2 * | 5/2003 | Katariya et al. | 709/214 |
| 6,604,139 B1 * | 8/2003 | Sajina et al. | 709/224 |
| 6,605,120 B1 * | 8/2003 | Fields et al. | 715/239 |
| 6,621,793 B2 * | 9/2003 | Widegren et al. | 370/230.1 |
| 6,715,129 B1 | 3/2004 | Hind et al. | 715/513 |
| 6,772,196 B1 * | 8/2004 | Kirsch et al. | 709/206 |
| 6,988,100 B2 * | 1/2006 | Jackson et al. | 707/10 |
| 6,996,530 B2 * | 2/2006 | Shizuka et al. | 704/260 |
| 7,146,402 B2 * | 12/2006 | Kucherawy | 709/206 |
| 7,164,913 B1 * | 1/2007 | Dantu et al. | 455/436 |
| 7,188,143 B2 * | 3/2007 | Szeto | 709/206 |
| 8,335,860 B2 * | 12/2012 | Moran et al. | 709/246 |
| 2001/0025278 A1 * | 9/2001 | Yourlo et al. | 707/2 |
| 2001/0054085 A1 * | 12/2001 | Kurganov | 709/218 |
| 2002/0059425 A1 * | 5/2002 | Belfiore et al. | 709/226 |
| 2002/0076025 A1 * | 6/2002 | Liversidge et al. | 379/202.01 |
| 2002/0099834 A1 * | 7/2002 | Sielaff et al. | 709/228 |
| 2002/0133568 A1 * | 9/2002 | Smith et al. | 709/219 |
| 2002/0160810 A1 * | 10/2002 | Glitho et al. | 455/560 |
| 2003/0101266 A1 * | 5/2003 | Trossen | 709/227 |
| 2004/0122977 A1 * | 6/2004 | Moran et al. | 709/246 |
| 2005/0193124 A1 * | 9/2005 | Chou et al. | 709/228 |

FOREIGN PATENT DOCUMENTS

| | | |
|---|---|---|
| DE | 100 48 940 | 4/2001 |
| DE | 100 46 345 | 3/2002 |
| EP | 1 043 657 | 10/2000 |
| WO | 01/78358 | 10/2001 |

OTHER PUBLICATIONS

Fesler, Wayback Machine dated Jun. 6, 2001 "Writing Servlet 2.3 Filters" from www.onjava.com.*
Rosenberg et al. ("Programming Internet Telephony Services", Network, IEEE, May/Jun. 1999).*
RFC2824, Lennox et al., Request for Comments: 2824, "Call Processing Language Framework and Requirements", May 2000.*
Bray T. Et al.'s, "Extensible Markup Language (XM) 1.0 (Second Edition)", W3C, World Wide Web Consortium XP002220864, pp. 1-59, Oct. 6, 2000.
International Search Report for International Application No. PCT/DE02/01382, (11 pages), Nov. 26, 2002.

* cited by examiner

```
         ┌ INVITE sip:user@company.com SIP/2.0
         │ To: sip:j_user@company.com
  15     │ From: sip:caller@university.edu
   \     │ Call-ID: Oha0isndaksdj@10.0.0.1
Header  ┤ Accept: text/newformat
         │ CSeq: 8 INVITE
         │ Via: SIP/2.0/UDP 135.180.130.133
         └ Content-Type: application/sdp                  ← 3

┌ v=0
         │ o=mhadley 29739 7272939 IN IP4 126.5.4.3
  Body  ┤ c=IN IP4 135.180.130.88
   /     │ m=audio 492170 RTP/AVP 0 12
   16    │ m=video 3227 RTP/AVP 31
         └ a=rtpmap:31 LPC
```

FIG 4

- `<AND>`
  ...
  `</AND>`          // two or more sub-expressions — 30

- `<OR>`
  ...
  `</OR>`           // two or more sub-expressions — 31

- `<NOT>`
  ...
  `</NOT>`          // exactly one sub-expression — 32

FIG 3

- <message-matches>
    ...
    </message-matches>   // message name pattern —26

- <header-exists>
    ...
    </header-exists>   // header name pattern —27

- <header-matches>
    <header-name>
        ...
    </header-name>   // header name —20
    <header-value>
        ...
    </header-value>   // header value pattern —21
    </header-matches>

- <request-direction>
    ...
    </request-direction>   // MO, MT, or MTU —25 (22, 23)

- <session-content type="application/sdp">
    <type-matches>
        <type-name>
            ...
        </type-name>   // type, e.g. "m" —28
        <type-value>
            ...
        </type-value>   // type value, e.g. "video" —29
    </type-matches>
    </session-content>

FIG 5

```
<!DOCTYPE trigger [
    <!ELEMENT trigger (message-matches | header-exists |
        header-matches | request-direction |
        session-content | AND | OR | NOT)>
    <!ELEMENT message-matches (#PCDATA)>
    <!ELEMENT header-exists (#PCDATA)>
    <!ELEMENT header-matches (header-name, header-value)>
        <!ELEMENT header-name (#PCDATA)>
        <!ELEMENT header-value (#PCDATA)>
    <!ELEMENT request-direction (#PCDATA)>
    <!ELEMENT session-content (type-matches)>
        <!ATTLIST session-content type CDATA #REQUIRED>
        <!ELEMENT type-matches (type-name, type-value)>
            <!ELEMENT type-name (#PCDATA)>
            <!ELEMENT type-value (#PCDATA)>
    <!ELEMENT AND ((message-matches | header-exists |
        header-matches | request-direction |
        session-content | AND | OR | NOT),
        (message-matches | header-exists |
        header-matches | request-direction |
        session-content | AND | OR | NOT)+)>
    <!ELEMENT OR ((message-matches | header-exists |
        header-matches | request-direction |
        session-content | AND | OR | NOT),
        (message-matches | header-exists |
        header-matches | request-direction |
        session-content | AND | OR | NOT)+)>
    <!ELEMENT NOT (message-matches | header-exists |
        header-matches | request-direction |
        session-content | AND | OR | NOT)>
]>
```

FIG 6

"Plain text"

All SIP INVITE messages from users of the domains "operator1.com" or "operator2.com" to a non-registered user with which a video session is to be established and in which a header occurs which begins with "X-com.siemens"

FIG 7

```
<trigger>
    <AND>
        <message-matches> "INVITE" </message-matches>
        <OR>
            <header-matches>
                <header-name> "From" </header-name>
                <header-value>
                    "*@operator1.com"
                </header-value>
            </header-matches>
            <header-matches>
                <header-name> "From" </header-name>
                <header-value>
                    "*@operator2.com"
                </header-value>
            </header-matches>
        </OR>
        <request-direction> "MTU" </request-direction>
        <session-content type="application/sdp">
            <type-matches>
                <type-name> "m" </type-name>
                <type-value> "video" </type-value>
            </type-matches>
        </session-content>
        <header-exists>
            "X-com.Siemens.*"
        </header-exists>
    </AND>
</trigger>
```

REPRESENTATION OF BOOLEAN EXPRESSIONS FOR SPECIFYING FILTERS USING XML

CLAIM FOR PRIORITY

This application is a national stage of PCT/DE02/01382, published in the German language on Oct. 23, 2003, which was filed in the german language on Apr. 12, 2002.

TECHNICAL FIELD OF THE INVENTION

The invention relates to a method and devices for filtering incoming messages, and in particular, at a connection controlling element of a telecommunication network on the basis of predetermined filter conditions.

BACKGROUND OF THE INVENTION

DE 100 48 940 A1 describes the transcoding of the output data stream from an application server.

Modern mobile radio networks are known to the person skilled in the art for example from the internet page http://www.3GPP.org (concerning specifications for UMTS mobile radio networks).

SUMMARY OF THE INVENTION

The present invention discloses an evaluation of messages conveyed in a telecommunication network (in particular, control messages such as SIP messages) in as simple and efficient a manner as possible.

By using a document in an Internet page description language, such as XML in particular, in which filtering conditions (for example: To whom should the SIP message go?, From whom does the SIP message originate?, Does the SIP message include a header?, Is this message setting up a video session?, Does the header contain particular character strings? etc.) and logical links of the filtering conditions (for example, AND operations: Are both filtering condition 1 and filtering condition 2 satisfied?; in other words Boolean operations) are defined, a simple and efficient evaluation of incoming messages in a connection controlling element (S-CSCF or another control or switching element of a telecommunication network) is possible by means of filtering. The use of a document in an internet page description language (such as XML) has the advantage of being simple to read and to program and, where necessary, to modify (in order to change filtering conditions). Moreover, a large number of supporting software tools (such as parsers, etc.) already exists. The simple modification and representation capabilities are suitable in particular for the great majority of users of a telecommunication network; the filtering conditions and their logical links can be stored for each user as an XML document in a user profile, etc. (in a home register or in S-CSCF). Depending on the result of the filtering (=text elements to be sought are contained or (if stipulated) not contained in the incoming message, the logical links apply or do not apply), routing of the message to the user of the telecommunication network and/or starting of one or more applications can be initiated. One example of an application could be support for setting up a chat using parameters specified in the message (relating to chat participants=sender and recipient of the message, amongst other things, etc.).

In particular, the message can be a Session Initiation Protocol (SIP) message or exhibit a different form and include conditions as text elements which are to be filtered by means of a filter (alphanumeric character strings, etc.).

The logical linking of filtering conditions can for example be the fact that two filtering conditions are present (for example, first filtering condition: header includes particular character strings; second filtering condition: message is directed to a particular subscriber) or that one of the two filtering conditions applies or that one filtering condition applies and the other does not apply. A logical link can also operate on more than two filtering conditions. In an individual case it is possible for the text to include one filtering condition. The comparison of text elements in an incoming message with text elements in the internet page description language document (defining the filters) can for example take place by means of character-by-character text comparison (comparing the individual characters in a text, taking into consideration the location of these characters) of alphanumeric characters contained in text elements.

BRIEF DESCRIPTION OF THE DRAWINGS

Further features and advantages of the invention will emerge from the description which follows of an embodiment with reference to the drawings. In the drawings.

DETAILED DESCRIPTION OF THE INVENTION

Figure 1:
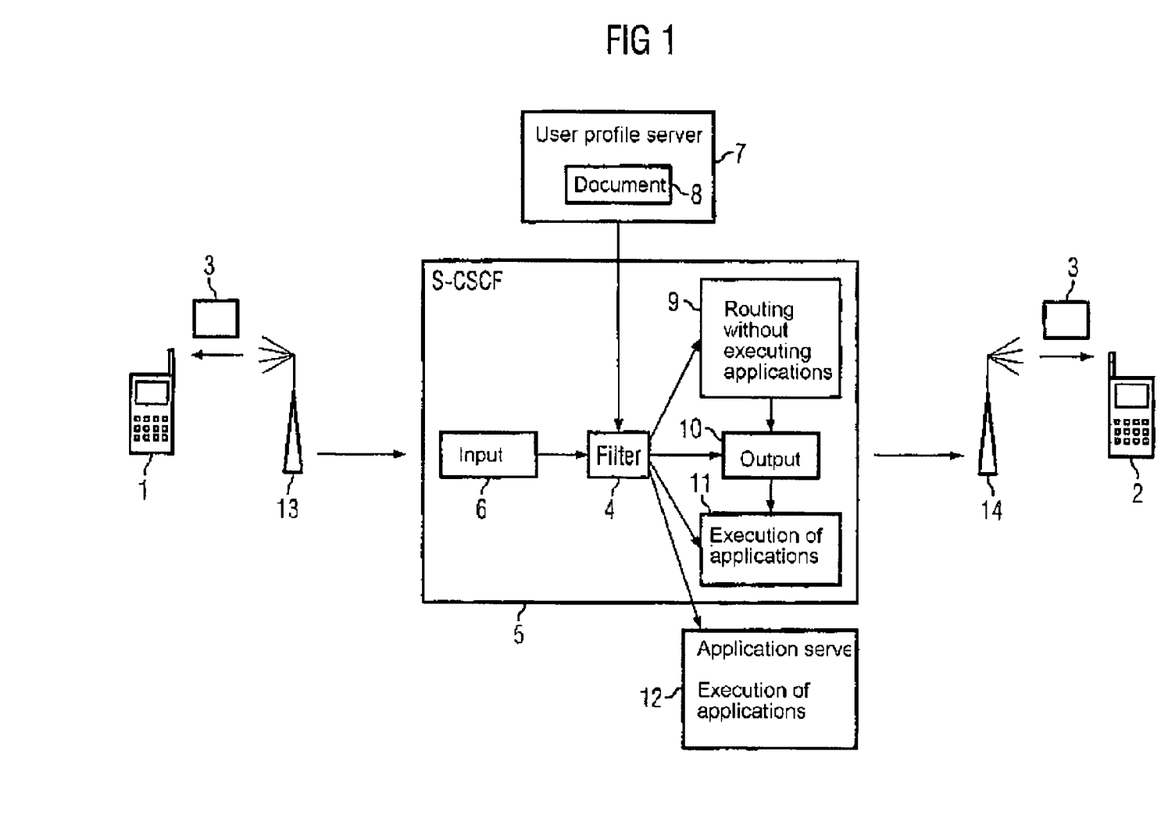
FIG. 1 shows a block diagram of the filtering of a SIP message sent by a first subscriber in a telecommunication network to a second subscriber in a telecommunication network.

FIG. 1 shows a SIP message 3 sent by a first subscriber 1 in a telecommunication network to a second subscriber 2 in a telecommunication network (by way of a mobile radio network indicated schematically by a base station 13 or 14 and/or a further telecommunication network), which is evaluated by a connection element S-CSCF of the application architecture of an IP-based Multimedia Subsystem (UMTS-IMS) using filtering according to the invention to determine which applications are to be executed or whether and to which destination the SIP message 3 is to be routed. The filtering conditions (where does the message come from?, does it initiate the set-up of a video session? etc.), the logical links of filtering conditions (does filtering condition 1 apply? and filtering condition 2 likewise? etc), and the specification of what is to be initiated in the message in the event of the filtering conditions and their logic operations being applicable (for example, which applications are to be executed) are part of a user profile (IMS-CSCF or HLA, etc.) for a subscriber (for example, the subscriber 2 to whom the message is being sent or the subscriber 1 who is sending the message).

In the case of a positive filtering result (filtering conditions and logic operations have been deemed to be applicable by the S-CSCF), the SIP message can be routed for example to an application server (possibly specified in the user profile by an address).

Applications which can be initiated by a SIP message or connection establishment related operations can for example be voice connections which are to be established or modified, video connections, chats etc. A SIP message is generally a text-based message by means of which, in particular, connection establishment controlling applications for sessions between users of a UMTS-IMS can be controlled.

A filter device 4 in the connection controlling element (IMS-CSCF) 5 can after receipt of a SIP message 3 at a schematically represented input 6 (interface) to the connection controlling element S-CSCF 5 download from a user profile database 7 for the subscriber from whom the message originates or (as here) to whom the message is directed (subscriber 2) a document 8 defining a filter into the filter 4 in the S-CSCF 5. In the filter 4, a check is performed as to whether the individual filtering conditions (presence of predetermined text elements) and their logical link (for example, two or more filtering conditions should apply simultaneously) apply in the message according to the predetermined filter values in the document 8 for the user (2) affected by the message. Depending on the result of the check in the filter 4, routing (9) to the B subscriber 2 can take place without an application being executed (if individual filtering conditions or links do not apply) or (if the individual filtering conditions apply and the logical links apply), depending on the contents of the message and predetermined values in the user profile for the user 2 (and/or 1), routing 10 of the message 3 (to the user 2) and/or initiation or execution of applications 11 can take place (in the S-CSCF 5 and/or in an application server 12).

In modern mobile radio networks (such as UMTS mobile radio networks, for example), the Session Initiation Protocol (SIP) is used for initiating interactive communication sessions (for example voice sessions, video sessions, chat sessions, interactive games) between users of the mobile radio telecommunication network.

Figure 2:
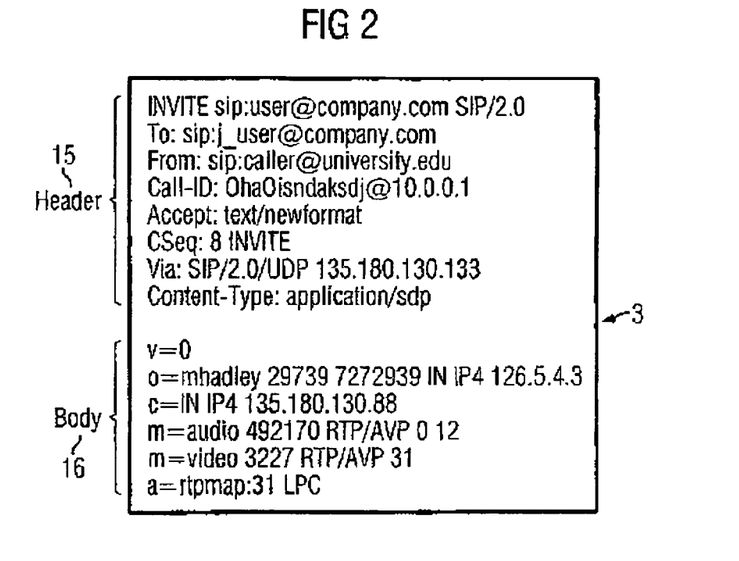
FIG. 2 shows an example of a SIP message.

FIG. 2 shows by way of example a SIP message which comprises a so-called header containing for example information (coming from which user Caller@university.edu or directed to the user j_user@company.com) relating to the origin and destination of the message. Information concerning for example the direction (for example mobile-originated or mobile-terminated or mobile-terminating for a non-registered user, etc.) can be obtained for example from internal status information of the S-CSCF (5). In addition to the (optional) header 15, a message possibly also contains a body 16 which specifies for example whether a video session (M=video), a chat session, etc. is to be established or modified.

Since a SIP message is structured as a text-based (alphanumeric, including text and/or numbers) message, comparisons can be carried out in respect of individual filtering conditions (text contained in the message and in the document 8) as a simple pattern comparison using regular expressions. It can be possible, for example, to filter the following properties (filtering conditions for a SIP message 3 and also logical links thereof):

Type (SIP method) or SIP message
Presence or absence of a header in the SIP message
Value of a header in the SIP message
Direction of the SIP message (mobile-originating, mobile-terminating, mobile-terminating for a non-registered user)
Session description information In order to perform the filtering in a simple and efficient manner, according to the invention the filter is implemented as an XML document 8 (stored in the user profile database 7) which is processed in the filter 4 and is described in the following with reference to FIGS. 3 to 7.

The use of the XML language has the advantage that it is a universal, interchangeable (in other words, capable of being processed by different computer architectures and easily read by human beings) description language for which there are already a large number of tools and which can be used easily.

A filter is in principle a Boolean linking of individual filtering conditions. A filter can in the simplest case includes a single filtering condition or can be formed (recursively) from conjunction, disjunction or negation of a plurality of filtering conditions.

Figure 3:
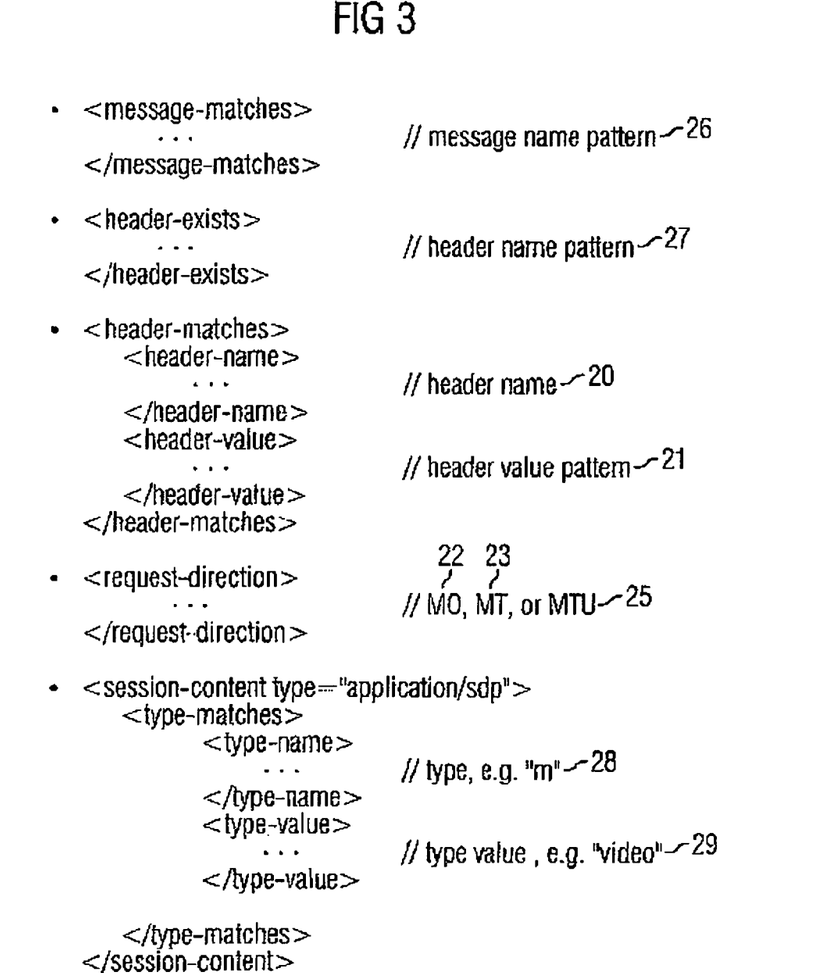
FIG. 3 shows the definition of XML tags for the definition of filtering conditions in an XML document filter.

The aforementioned simple filtering conditions are described in the following with reference to FIG. 3, represented by special XML tags. An individual filtering condition is described with the aid of an XML tag "Trigger" as follows:
[Trigger]
. . . //boolean expression
[/Trigger].

In addition, the XML tags shown in FIG. 3 which by way of example describe several filtering conditions are defined.

The filtering condition given under the first point defines the query as to whether a predetermined pattern (message name pattern) is included in the message. The XML tag given under the second point (header name pattern) defines whether a pattern is included in the header of the message. The filtering condition given under the third point (header matches) checks whether the name of the header and a pattern in the header are included as a text element (alphanumeric character string) in the message. The fourth filtering condition (request-direction) is used for checking whether the message is mobile-originating (MO), mobile-terminating (MT) or (MTU) (mobile-terminated for unknown users). The filtering condition given under the fifth point concerns the query about the session content type—in other words whether for example a "video" session is to be started, etc. by the message. At the places in FIG. 3 at which "pattern" appears, a text expression can be inserted in each case, such as for example an address "prepaid@operator.com", etc.

Figure 4:
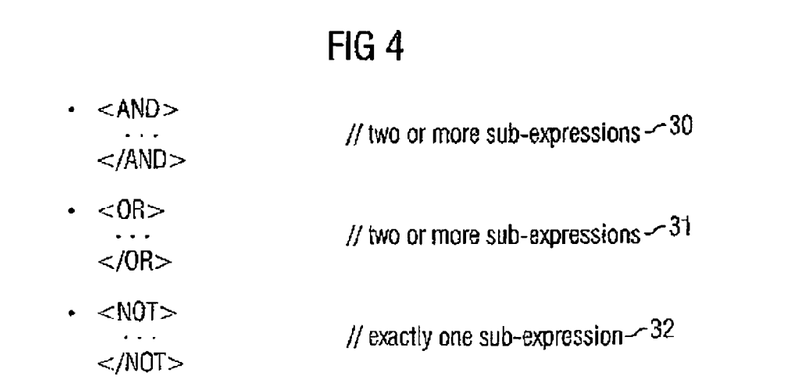
FIG. 4 shows by way of example logical linking of individual filtering conditions.

A (possibly recursively nested) linkage of sub-expressions (filtering conditions) by means of Boolean operators and/or/not (=logical linkage) is achieved by means of the three XML tags shown in FIG. 4. In this situation, a sub-expression can be either a simple condition or—defined recursively—in its turn a linkage of sub-expressions by means of the aforementioned Boolean operators.

A basic principle of the invention thus includes the definition of the simple filtering conditions for filtering SIP messages, their linkage to form a Boolean expression and also the conversion of the structure of a Boolean expression of such a type into the structure of an XML document. The method can be used, for example, within the scope of an IP multimedia subsystem for 3GGP. It can for example be part of a UMTS-R5 compliant S-CSCF (Serving Call State Control Function).

Figure 5:
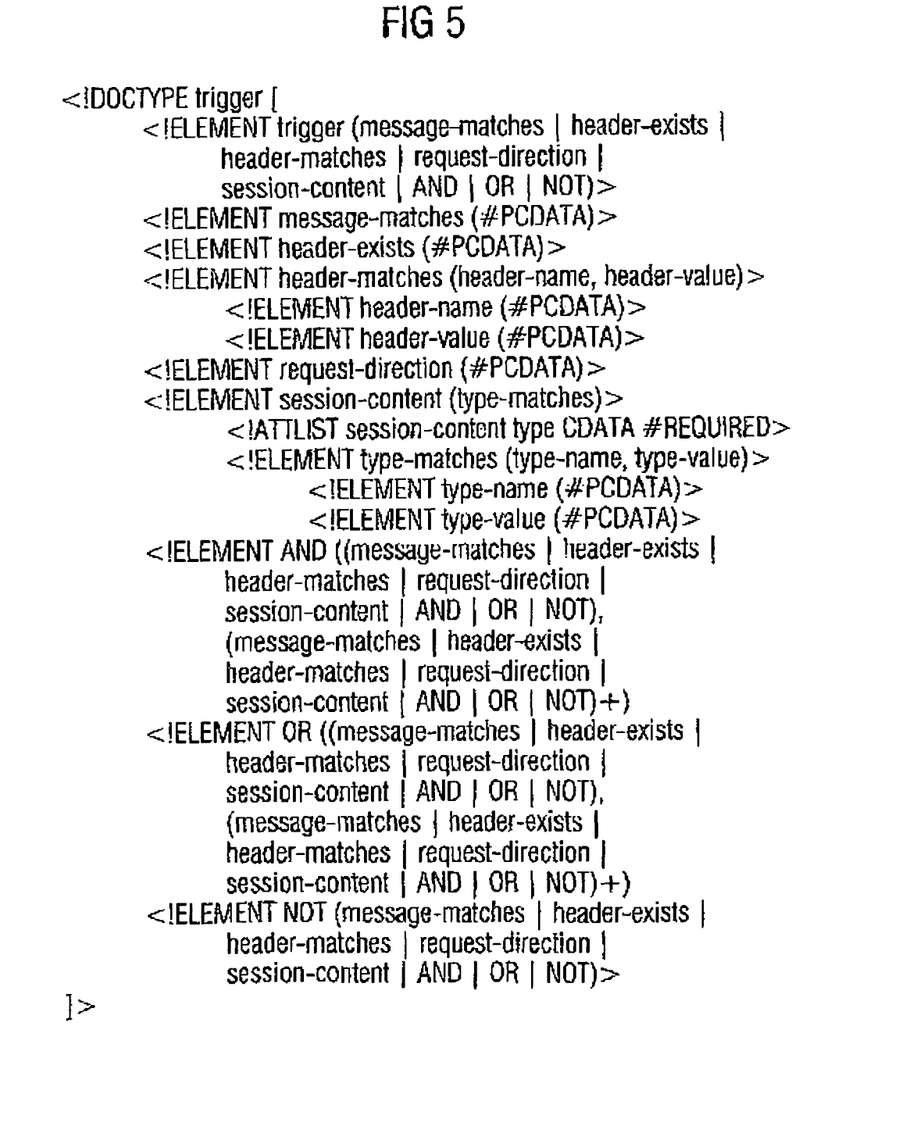
FIG. 5 shows the definition of the format of a document defining a filter as XML-DTD.

FIG. 5 shows by way of example how the format of the documents to be used as filters can be described in the XML language by using a DTD (document type definition) in order that they describe a valid document.

Figure 6:
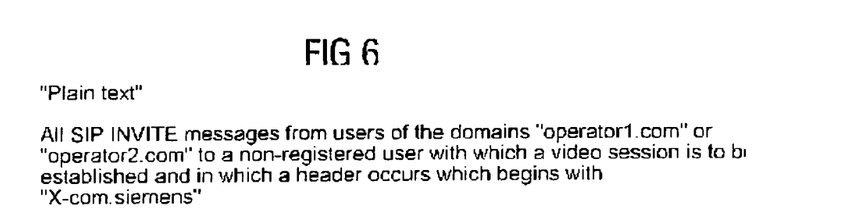
FIG. 6 shows by way of example a filter expression in plain text.

FIG. 6 shows in plain text, in other words as a statement in an ordinary language for human beings, an example of a filter which is to be defined as a document (XML).

Figure 7:
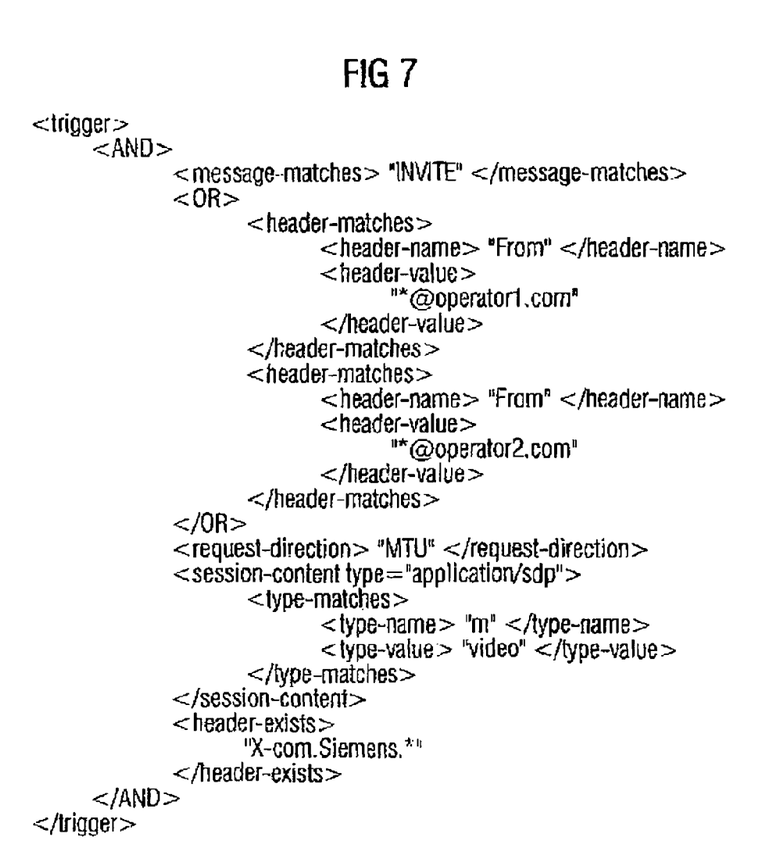
FIG. 7 shows a document with an XML representation of the filter represented as plain text in FIG. 6.

FIG. 7 shows the conversion of the filter defined in FIG. 6 into an XML document. In addition to using XML, the use of other internet page description languages which are already under development or will be developed in the future is also conceivable.

The invention claimed is:

1. A method for filtering incoming messages in a mobile radio network based on predetermined filter conditions, comprising:
   in a connection controlling element between and remote from a message sender and a message recipient:
      receiving an incoming message;
      in response to receiving the incoming message, said connection controlling element:
         accessing a user profile database storing a plurality of user-specific Internet page description language documents corresponding to a plurality of different users, each user-specific Internet page description language document including filter conditions and logical linkages of filter conditions specific to a respective user, and
         automatically identifying from the user profile database a particular user-specific Internet page description language document corresponding to either the message sender or the message recipient and including user-specific filter conditions and logical linkages of two or more of the filter conditions defined as passive, non-executable text elements including alphanumeric character strings;
      executing active, executable computer instructions to compare the alphanumeric character strings of the passive, non-executable text elements defined in the identified user-specific Internet page description language document with alphanumeric character strings in the text comprised in the incoming message;
      based on the comparison of the alphanumeric character strings of the passive, non-executable text elements defined in the Internet page description language document with the alphanumeric character strings in the text comprised in the incoming message, determining (a) whether one or more of the filter conditions apply to the incoming message, and (b) whether one or more of the logical linkages of the filter conditions apply to the incoming message, and
      based on the determinations of whether the filter conditions and logical linkages of the filter conditions apply to the incoming message, determining:
         (a) whether to route said incoming message to a user of said mobile radio network, and
         (a) whether to initiate one or more applications by the connection controlling element, wherein the one or more applications are specified as text in the Internet page description language document.

2. The method according to claim 1, wherein the passive, non-executable text elements include alphanumeric characters.

3. The method according to claim 1, wherein the connection controlling element is a switching facility or signaling facility of a mobile radio network.

4. The method according to claim 1, wherein the internet page description language is XML.

5. The method according to claim 1, wherein the message is a Session Initiation Protocol message.

6. The method according to claim 1, wherein the filter conditions are defined in the document as XML tags.

7. The method according to claim 1, wherein the logical linkages of filter conditions is defined by at least one of Boolean operators and/or/not.

8. The method according to claim 1, wherein the filter conditions are defined in a document as XML-DTD.

9. The method according to claim 1, wherein a filter condition is defined as whether the message originates from a particular user of a telecommunication network.

10. The method according to claim 1, wherein a filter condition is defined as whether the header or body of a message includes a text element specified in the document.

11. The method according to claim 1, wherein a filter condition is defined as the direction in which the message is directed.

12. The method according to claim 1, further comprising comparing the text comprised in the incoming message with particular status information determined by the connection controlling element.

13. The method according to claim 1, wherein applications are executed and/or the message is routed to a user to whom it is directed by the message if the filter conditions and logical links apply.

14. The method according to claim 1, wherein a result of filtering a decision is taken as to which application is to be started.

15. The method according to claim 1, wherein at least one document is stored for a user of the telecommunication network in a profile file.

16. A connection controlling element for a mobile radio network, comprising:
   an input for receiving incoming messages;
   a memory or access to a memory storing a plurality of user-specific Internet page description language documents corresponding to a plurality of different users, each user-specific Internet page description language document including filter conditions and logical linkages of filter conditions specific to a respective user;
   a filtering facility for filtering incoming messages at the input using said Internet page description language document stored in said memory in response to receiving the incoming messages, wherein said filtering includes:
      automatically identifying from the user profile database a particular user-specific Internet page description language document corresponding to either the message sender or the message recipient and including user-specific filter conditions and logical linkages of two or more of the filter conditions defined as passive, non-executable text elements including alphanumeric character strings;
      executing active, executable computer instructions to compare the alphanumeric character strings of the passive, non-executable the text elements defined in the identified user user-specific Internet page description language document with alphanumeric character strings in the text comprised in the incoming message;
      based on the comparison of the alphanumeric character strings of the passive, non-executable text elements defined in the Internet page description language document with the alphanumeric character strings in the text comprised in the incoming message, determining whether one or more of the filter conditions apply to the incoming message, and determining whether one or more of the logical linkages of the filter conditions apply to the incoming message; and
   an output operable to send messages or notify messages to a user to whom the message is directed and, depending on the filtering determinations, to send messages or notify messages to facilities for executing applications specified by the message,
   wherein the connection controlling element is between and remote from a message sender and a message recipient.

17. A system for filtering incoming messages in a mobile radio network based on predetermined filter conditions, comprising:

a message sender, a message recipient; and a user profile database storing a plurality of user-specific Internet page description language documents corresponding to a plurality of different users, each user-specific Internet page description language document including filter conditions and logical linkages of filter conditions specific to a respective user;

a connection controlling element between and remote from the message sender and the message recipient, wherein the connection controlling element comprises a filter which is configured to, responsive to receiving the message:

automatically identify from the user profile database a particular user-specific Internet page description language document corresponding to either the message sender or the message recipient and being written in an internet page description language and including passive, non-executable text elements including alphanumeric character strings that define (a) filter conditions and (b) logical linkages of two or more of the filter conditions specific to either the message sender or the message recipient; the filter being further configured to filter the incoming message using said identified user-specific Internet page description language document by executing active, executable computer instructions to compare the alphanumeric character strings of the passive, non-executable text elements defined in the Internet page description language document with alphanumeric character strings in the text comprised in the incoming message, and based on such comparison, determining whether one or more of the filter conditions apply to the incoming message, and whether one or more of the logical linkages of the filter conditions apply to the incoming message, and wherein the connection controlling element is configured depending on a result of the filtering of the incoming message to at least one of:

route of said incoming message to a user of said mobile radio network, and initiate a start of one or more applications.

18. The system according to claim 17, wherein the connection controlling element is a switching facility or signaling facility of a mobile radio network.

19. The system, according to claim 17, wherein the internet page description language is XML.

20. The method according to claim 1, wherein the message is a Session Initiation Protocol message.

* * * * *